March 21, 1961 G. H. FATHAUER 2,976,356

SLOW SWEEP TELEVISION SYSTEM

Filed Sept. 9, 1955 4 Sheets-Sheet 1

Inventor
George H. Fathauer by Hill, Sherman, Meroni, Gross & Simpson Attys

March 21, 1961 G. H. FATHAUER 2,976,356

SLOW SWEEP TELEVISION SYSTEM

Filed Sept. 9, 1955 4 Sheets-Sheet 2

Inventor
George H. Fathauer
by Hill, Sherman, Meroni, Gross & Simpson Attys

Inventor
George H. Fathauer
By Hill, Sherman, Meroni, Gross & Simpson Attys

Inventors
George H. Fathauer
by Hill, Sherman, Meroni, Gross & Simpson Attys

United States Patent Office 2,976,356

Patented Mar. 21, 1961

2,976,356

SLOW SWEEP TELEVISION SYSTEM

George H. Fathauer, Decatur, Ill., assignor to Thompson Ramo Wooldridge Inc., a corporation of Ohio Filed Sept. 9, 1955, Ser. No. 533,286

8 Claims. (Cl. 178—6.8)

This invention relates to a television system and more particularly to a slow sweep television system in which the sweep circuits are operated at rates low enough for transmission of the video signal over telephone lines.

As in the conventional television system, a scanning process is used in which a transmitting spot and a reproducing spot are moved in synchronism and in similar patterns over the image to be transmitted and the viewing screen, respectively, the intensity of the reproducing spot being controlled by the intensity at the transmitting spot. The scanning pattern, generally referred to as the "raster," comprises a number of parallel lines and is repeated at a certain frame rate. With the plane of the viewing screen vertical, the lines are ordinarily horizontal and the repetition rate of the lines hereinafter referred to as the "horizontal rate" or "line rate." The repetition rate of the pattern is hereinafter referred to either as the "vertical rate" or the "frame rate." With this scanning system, the channel for transmitting the brightness or intensity signal from the transmitter to the reproducer should have a gain substantially constant over a frequency range from a frequency equal to the frame or vertical rate to a frequency on the order of a frequency equal to the vertical rate times the square of the number of lines in each frame, multiplied by the ratio of the horizontal resolution to the vertical resolution and divided by two.

Conventional telephone lines are not ordinarily used to transmit signals above about 5000 cycles per second but by appropriate techniques can transmit signals through 20,000 cycles and it is conceivable that such lines may be used to transmit signals up to about 100 kc. In the system of this invention, the maximum value of one-half of the product of the frame rate and the square of the number of lines per frame is on the order of 100 kc. but, preferably, the frame rate is 0.1 cycle per second and the line repetition rate of 60 cycles per second. Thus, the vertical resolution has 600 lines and if the channel from the transmitter to the reproducer will transmit up to 18,000 cycles per second, as is achievable with telephone lines, the horizontal resolution may be on the order of 600 lines also. The 60 cycle line rate is particularly desirable in minimizing power line interference and because, as will be explained in detail hereinafter, the power line may be used as a synchronizing connection between the transmitter and the reproducer.

It will be appreciated that with a frame rate equal to 0.1 cycle per second, a period of 10 seconds is required for completion of one frame and hence this system could not be used to transmit scenes in motion. However, it can be used to transmit images of stationary objects, photographs, records and the like to great advantage.

The television system of this invention preferably utilizes a camera tube of the type having a light-sensitive energy storage target scanned by a cathode ray beam to produce the video signal. It has been discovered that remarkably improved sensitivity is achieved with the use of such a tube in the television system of this invention, as compared with the use of such a tube in the ordinary television system, due to the fact that the scan of the target is much slower and the energy of the light on each incremental area of the target may be stored up over a much longer period and a substantial electrical output is obtained even when the total energy of an image focused on the target is very small. Accordingly, the system can be used in applications in which the lighting is very poor and in which the ordinary television system would be completely inoperable.

The reproducer utilized in the television system of this invention preferably is of the type comprising a picture tube having a screen scanned by a cathode ray beam and coated with a fluorescent material to give a light output when so scanned. The screen should have the property of phosphorescence (i.e. persistence of luminescence after removal of excitation) to such an extent that the image is retained a time period of the same order of magnitude as the period of one frame. A material having a long persistence time such as zinc sulfide on zinc-cadmium sulfide may be used as the fluorescent material or if desired, a phosphorescent material having the proper persistence time may be used with an efficient fluorescent material of low persistance time, either on the same member scanned by the cathode ray beam or on a member separate therefrom.

It might be noted that although the camera and reproducing tubes will preferably be as above described for most applications, the camera tube may be any device which will produce a signal corresponding to an image or the like and the reproducer may be any device which will respond to such a signal. For example, either the camera tube or the reproducer tube may be a tube of a type generally referred to in the art as a "storage tube" which includes a storage target, means for recording a charge image on the target and means for reading the stored information when desired.

To synchronize the operation of the scanning systems of the transmitter and reproducer, synchronizing pulses are transmitted from the transmitter to the reproducer. While the elaborate synchronizing pulse systems of conventional television systems may be used, it has been found that such are not necessary and the pulses formed from "blanking" of the camera tube are sufficient. The horizontal and vertical (or "line" and "frame") pulses are distinguished from one another in duration and at the reproducer a suitable integrating circuit is used in controlling the vertical sweep generator. A clamping circuit is preferably used at the output of the video amplifier in the reproducer to prevent loss or attenuation of low frequency components and to permit the use of capacitor and transformer coupling in the video amplifiers of the camera and reproducer.

In accordance with a specific feature of the invention, a reproducer unit is provided which includes a picture tube and horizontal and vertical sweep generators. The reproducer unit is arranged to be connected to a separate camera unit with the sweep generators of the reproducer unit connected to the deflection means of the camera tube. A power supply in the reproducer unit is preferably used for the camera unit in addition. When the camera unit is being used, the picture tube of the reproducer unit connected thereto is used as a monitor and, also, an amplifier of the reproducer unit is preferably used to apply the video signal to the telephone line or whatever is used to transmit the signal.

With this arrangement, it is not necessary to construct a camera unit having its own horizontal and vertical sweep generators and power supply and if only a reproducer unit is desired at a particular location, it is not necessary to provide a camera unit. However, if a camera unit should become desirable it can be readily connected to the existing reproducer unit. A reproducer unit is required to operate each camera unit, but this feature is not undesirable because a monitor is a practical necessity to obtain proper camera operation. Further, the provision of the picture tube in the reproducer unit is relatively inexpensive compared to the cost of a camera tube.

The horizontal sweep generator used in the system of this invention preferably comprises a saw-tooth wave generator in the form of a blocking oscillator and an amplifier coupled through a transformer to the deflection means of the camera and picture tubes.

The vertical sweep generator is preferably of a special type arranged to generate a saw-tooth voltage varying between approximately equal negative and positive values (i.e., a wave having no direct current component) which can be directly coupled to the deflection means of the camera and picture tubes and have the raster centered on the screens thereof. The coupling capacitor or transformer conventionally used between saw-tooth generators and deflection coils to remove direct current components has been found undesirable in the system of this invention because the very low vertical sweep rate would necessitate a very large and expensive capacitor or transformer.

In accordance with a further specific feature of the invention, the vertical sweep generator is arranged to present a minimum load variation to the power supply therefor. This is important because with the extremely low vertical sweep rate, an extremely large and impractical size of power-supply capacitor would be required to eliminate the effect of load variations. In the conventional television systems having high sweep rates, the effect of load variations is substantially eliminated by power-supply capacitors of conventional size.

In a preferred construction of the vertical sweep generator, a pair of tubes are used to apply a saw-tooth wave to the deflection means and such tubes are arranged so that the current through one tube decreases while the current through the other increases to minimize load variations.

In accordance with a further specific feature of the invention, the vertical sweep generator comprises a saw-tooth wave generator and an amplifier with negative or inverse feedback. With this arrangement, the saw-tooth wave generator which draws comparatively small power, can be connected to a regulated power supply and the amplifier which may draw considerable power can be connected to an unregulated power supply but because of the negative or inverse feed-back the effect of power supply variations may be substantially eliminated.

An object of this invention, accordingly, is to provide an improvement television system in which the video signal may be transmitted over ordinary telephone lines.

Another object of this invention is to provide an improved television system utilizing a camera tube having a light-sensitive energy storage target in which the sweep circuits are operated at a slow rate to greatly increase the sensitivity of the camera.

A further object of this invention is to provide an improved television system having sweep circuits operated at a slow rate and including improved and simplified means for synchronizing the transmitter and reproducer sweep circuits.

Still another object of this invention is to provide an improved television system having sweep generators efficiently operable at a slow rate.

A still further object of this invention is to provide an improved television system in which separate camera and reproducer units are arranged to be connected together with sweep generators and other elements of the reproducer unit being used for both the camera and the reproducer.

This invention contemplates other objects, features and advantages which will become more fully apparent from the following detailed description taken in conjunction with the accompanying drawings which illustrate preferred arrangements and in which.

Figure 1:
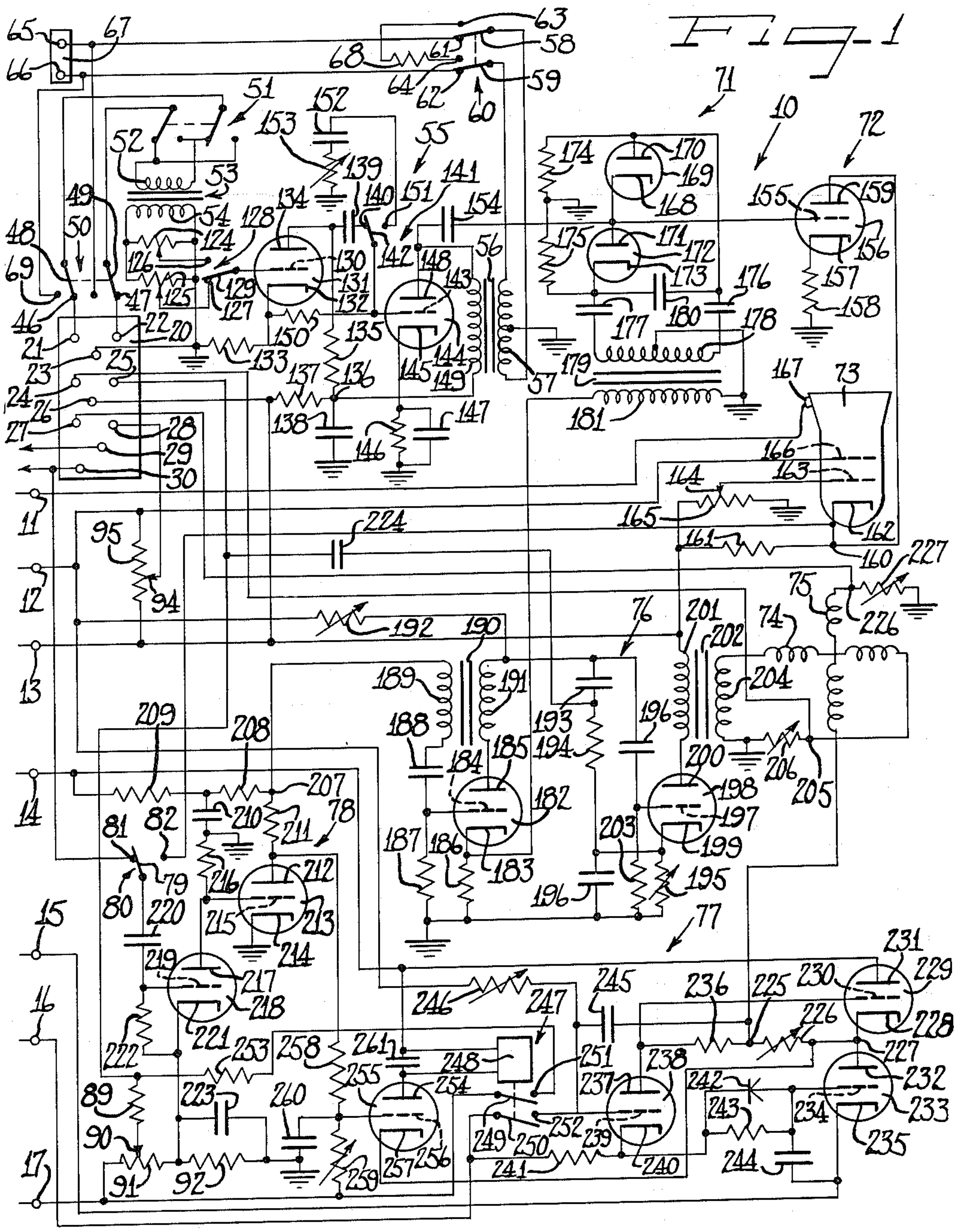
Figure 1 is a circuit diagram of a portion of a slow sweep reproducer unit constructed in accordance with the principles of this invention.

Reference numeral 10 generally designates a reproducer unit constructed according to the principles of this invention which is connected to terminals 11—17 of a power supply 18, the power supply 18 being preferably an integral part of the reproducer unit 10.

Figure 2:
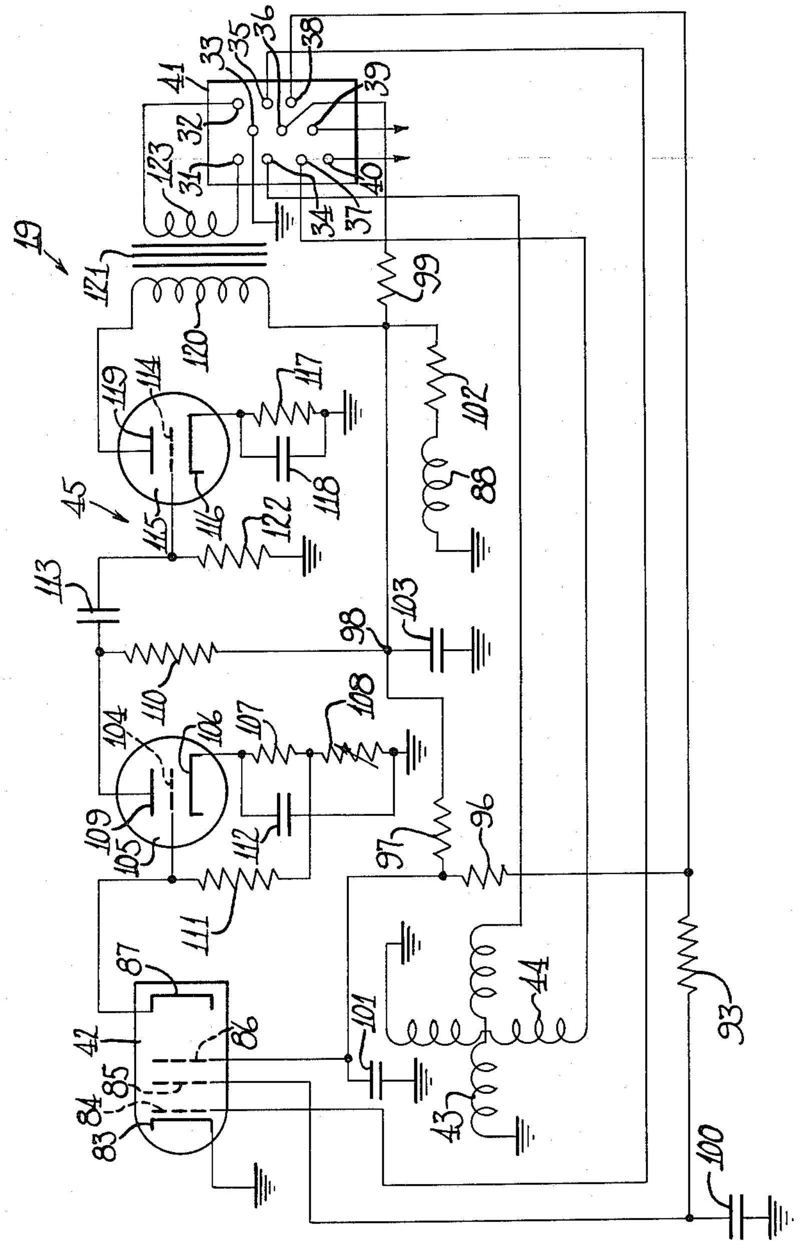
Figure 2 is a circuit diagram of a camera unit arranged to be connected to the reproducer unit of Figure 1.

The reproducer unit 10 is arranged to be connected to a separate camera unit 19 illustrated in Figure 2 and for this purpose the unit 10 has a panel or jack 20 having terminals 21—30 respectively connectable through suitable cable and plugs to terminals 31—40 of a panel or jack 41 of the camera unit 19.

In general, the camera unit 19 comprises a pick-up tube 42 having horizontal deflection coils 43 and vertical deflection coils 44, a video signal from the tube 42 being amplified by an amplifier generally designated by reference numeral 45 and applied to the terminals 31 and 32 of the jack 41. As above indicated, the terminals 31 and 32 are connected through a cable to terminals 21 and 22 of the jack 20 of the reproducer unit 10. Terminals 21 and 22 are connected to terminals 46 and 47 arranged to be engaged by movable contacts 48 and 49 of a selector switch 50. The movable contacts 48 and 49 are connected through a reversing switch 51 to the primary 52 of an input transformer 53 having a secondary 54 which is connected to an amplifier generally designated by reference numeral 55. The amplifier 55 includes an output transformer 56 having a secondary winding 57 connected to movable contacts 58 and 59 of a selector switch 60. The contacts 58 and 59 may be connected either to terminals 61 and 62 or terminals 63 and 64. Terminals 61 and 62 are connected to terminals 65 and 66 of a jack 67 arranged to be connected to a telephone line or whatever is used to transmit the video signal, terminals 63 and 64 being connected to a suitable resistor 68 providing a proper load for the output transformer 56.

In transmitting operation, the selector switches 50 and 60 will be in the positions illustrated in Figure 1 with the output of the camera unit being connected to the input of the amplifier 55 and with the output of the amplifier 55 connected to the jack 67. In reproducing operation, the selector switch 50 is moved to a position in which contacts 48 and 49 engage terminals 69 and 70 connected to terminals 65 and 66 of the jack 67 so that the input of the amplifier 55 is connected to the telephone line, and the selector switch 60 is moved to a position in which resistor 68 is connected to the secondary 57 of the output transformer 56. Actually, the selector switches 50 and 60 are ganged so as to be simultaneously actuated.

An output from the amplifier 55 is also connected to a clamping circuit 71 and to a further amplifier stage 72 which applies the video signal to a picture tube 73. In transmitting operation, the tube 73 is used as a monitor and in receiving or reproducing operation, a picture is developed on the screen of the tube 73 corresponding to a signal received at the terminals 65 and 66 of the input jack 67.

The picture tube 73 has horizontal deflection coils 74 and vertical deflection coils 75 which are respectively connected to horizontal and vertical sweep generators generally designated by reference numerals 76 and 77, the deflection coils 43 and 44 for the camera tube 42 being connected in circuit with the deflection coils 74 and 75. A synchronizing pulse separating and amplifying circuit generally designated by reference numeral 78 is connected to the horizontal and vertical sweep generators 76 and 77, the input of the circuit 78 being connected to a movable contact 79 of a selector switch 80. In transmitting operation, the contact 79 is engaged with a terminal 81 connected to a source of 60 cycle power line current. In receiving or reproducing operation, the contact 79 is engaged with a terminal 82 which is connected to an output from the video amplifier stage 72. The selector switch 80 is preferably ganged to the selector switches 50 and 60.

The power supply 18 will be described in detail hereinafter but it may be here noted that it is preferably arranged to supply regulated voltages of plus 310 volts, plus 160 volts, and minus 108 volts at terminals 12, 13 and 17 respectively (the voltages being taken with respect to a common ground connection); unregulated voltages of plus 100 volts, minus 100 volts, and minus 120 volts at terminals 14, 15 and 16 respectively; and plus 8000 volts at the terminal 11.

The camera tube 42 comprises a cathode 83 connected to ground and arranged to be heated to cause emission of electrons therefrom which electrons pass successively through a control grid 84, an accelerator grid 85, and a focusing grid 86 to a target 87. A coil 88 is used in conjunction with the focusing electrode 86 to focus the electrons emitted by the cathode into a very narrow beam at the target 87.

The control grid 84 is connected to the terminal 35 of the jack 41 and hence to the terminal 25 of the jack 20 which as shown in Figure 1 is connected through a resistor 89 to a movable contact 90 of a potentiometer 91 connected at one side to the terminal 17 and at the other end through a resistor 92 to ground. The control grid 84 is thus at a negative potential relative to ground, the exact potential being adjustable by adjustment of the potentiometer 91 which forms a "beam" control for the camera.

The accelerator grid 85 is connected through a resistor 93 to the terminal 38 of the jack 41 and hence to the terminal 28 of the jack 20 which as shown in Figure 1 is connected to the movable contact 94 of a potentiometer 95 connected between the power supply terminals 12 and 13, which may be at regulated potentials of plus 310 volts and plus 160 volts, respectively, relative to ground. The focusing grid 86 is connected through a resistor 96 to the terminal 38 of the jack 41 and through a resistor 97 to a circuit point 98 which is connected through a resistor 99 to the terminal 36 of the jack 41 and hence to the terminal 26 of the jack 20 which is connected to the power supply terminal 13 which may be of a regulated potential of plus 160 volts relative to ground. Accordingly, by adjustment of the potentiometer 95, the potentials of both the accelerating grid 85 and the focusing grid 86 are adjusted, the potentiometer 95 thus forming a camera focus control. Capacitors 100 and 101 are respectively connected between the grids 85 and 86 and ground to stabilize the voltages of the grids.

The coil 88 is connected to ground and through a resistor 102 to the circuit point 98. It may be here noted that the circuit point 98 may be connected through a filter capacitor 103 to ground.

The target 87 may comprise the glass-plate of the tube 42 with a light-sensitive element comprising a transparent conducting film coating on the inner surface of the glass-plate and a thin layer of photo-conductive material on the scanning side of the film. An image may be focused on the target 87 as by means of a suitable lens and the photo-conductive layer may be such that if effective resistance decreases as the light intensity thereon increases and also as the length of time that the light is focused thereon increases. The electron beam generated by the cathode 83 and grids 84, 85 and 86 is caused to scan the target 87 in a certain pattern by application of saw-tooth currents to the deflection coils 43 and 44 and a varying electrical signal is produced at the target 87 corresponding to the image focused thereon.

The amplifier 45 serves to amplify this signal and in particular, the target 87 is connected to the control grid 104 of a triode 105 having a cathode 106 connected through a resistor 107 and a rheostate 108 to ground and a plate 109 connected through a load resistor 110 to the circuit point 98. The control grid 104 is connected through a resistor 111 to the junction between resistor 107 and rheostat 108 and the cathode 106 is connected through a by-pass capacitor 112 to ground. The target current is adjustable by adjustment of the rheostat 108.

It will be appreciated that a video signal is developed across the load resistor 110. This signal is coupled through a coupling capacitor 113 to the control grid 114 of a triode 115 having a cathode 116 connected through a resistor 117 and through a parallel by-pass capacitor 118 to ground and a plate 119 connected through the primary 120 of an output transformer 121 to the circuit point 98. The grid 114 is connected through a resistor 122 to ground. The output transformer 121 has a secondary winding 123 connected to the terminals 31 and 32 of the jack 41. As above indicated, the terminals 31 and 32 are connected through a cable to the terminals 21 and 22 of the jack 20 of the reproducer unit 10 which are connectable through the selector switch 50 and the reversing switch 51 to the primary 52 of the input transformer 53.

A pair of potentiometers 124 and 125 are connected across the secondary winding 54 of the input transformer 53, the potentiometers 124 and 125 having movable contacts respectively connected to terminals 126 and 127 of a selector switch 128 having a movable contact 129. One side of the secondary 54 is connected to ground and in one position of the selector switch 128, the signal amplitude between the movable contact 129 and ground is determined by the position of one of the potentiometers 124 and 125 with the amplitude being controlled by the other potentiometer in the other position of the selector switch. Thus, the potentiometer 124 may function in a reproducing operation and the potentiometer 125 may function in the transmitting operation and readjustment is not necessarily required in switching from transmitting to reproducing. The selector switch 128 may be ganged to the selector switches 50, 60 and 80.

The movable contact 129 of the selector switch 128 is connected to the control grid 130 of a triode 131 having a cathode 132 connected through a bias resistor 133 to ground, and a plate 134 connected through a load resistor 135 to a circuit point 136 which is connected through a resistor 137 to the power supply terminal 13, a filter capacitor 138 being connected between the circuit point 136 and ground.

A plate 134 is connected through a coupling capacitor 139 to a terminal 140 of a selector switch 141 having a movable contact 142 which is connected to the control grid 143 of a triode 144 having a cathode 145 connected through a bias resistor 146 and a by-pass capacitor 147 to ground, and a plate 148 connected through a primary winding 149 of the output transformer 56 to the circuit point 136. The grid 143 is also connected through a resistor 150 to the cathode 132 of the triode 131. In the transmitting position of the selector switch 141 which is illustrated, the signal applied to the grid 143 is the resultant of the signal coupled through the capacitor 139 from the plate 134 and the signal coupled through the resistor 150 from the cathode 132, the signal from the cathode being out of phase with respect to the signal from the plate. The capacitance of the capacitor 139 is such that it is essentially an open circuit for low frequency components, resulting in the full signal at the cathode 132 being applied to the grid 143, while for high frequency components, the capacitor 139 is essentially a short circuit and the signal at plate 134 is effectively connected to the grid 143. The overall effect is a phase shift varying with frequency to compensate for phase shifts of capacitors 147 and 118.

In the reproducing position of the switch 141 the movable contact 142 engages a terminal 151 which is connected through an equalizing circuit including a capacitor 152 and rheostat 153 to ground. Thus, in the position of the selector switch not illustrated, the triodes 131 functions only as a cathode-follower, and equalization is obtained through the capacitor 152 and rheostat 153.

In addition to being connected to the primary of the output transformer 56, the plate 148 of the output tube 144 is connected through a capacitor 154 to the grid 155 of a triode 156 forming the amplifier stage 72, the triode 156 having a cathode 157 connected through a bias resistor 158 to ground and a plate 159 connected to a circuit point 160 which is connected through a resistor 161 to the power supply terminal 13. It will thus be appreciated that a video signal is produced across the resistor 161 corresponding to the signal at the input to the amplifier 55. This signal is applied to the picture tube 73 by connecting the circuit point 160 to the cathode 162 thereof. The picture tube 73 also has a control grid 163 connected to the movable contact 164 of a potentiometer 165 connected between ground and the power supply terminal 13. An accelerating grid or electrode 166 of the picture tube 13 is connected to the power supply terminal 12 and a high voltage electrode 167 is connected to the power supply terminal 11 which as above indicated may be at a potential of 8000 volts with respect to ground. The brightness at the picture tube screen is, of course, controlled by adjustment of the potentiometer 164.

As above indicated, the clamping circuit 71 is provided for minimizing attenuation or loss of direct current and low frequency components of the signal. In particular, the clamping circuit 71 functions to fix the potential of the grid 155 at the start of each horizontal sweep, with the charge accumulated by the capacitor 154 in the preceding horizontal sweep having no effect. For this purpose, the grid 155 is connected to the cathode 168 of a diode 169 having a plate 170 and to the plate 171 of a diode 172 having a cathode 173, the plate 170 and the cathode 173 being respectively connected through resistors 174 and 175 to ground and through capacitors 176 and 177 to opposite ends of a secondary 178 of a transformer 179, the secondary 178 having a center tap connected to ground. A capacitor 180 may be connected between the plate 170 and the cathode 173. The transformer 179 has a primary 181 connected at one end to ground and at the other end to a point in the horizontal sweep generator at which a rectangular pulse coinciding with the horizontal blanking time is developed. During the application of such a pulse, the plate 170 of the diode 169 will be driven in a positive direction and the cathode 173 of the diode 172 will be driven in a negative direction to cause both diodes to conduct. The resistors 174 and 175 have resistances of equal value and the potential of the grid 155 is then fixed substantially at ground potential, the coupling capacitor 154 being then charged to a value corresponding to the difference between the potential of the plate 148 and ground potential. During the application of the pulse, the capacitors 176 and 177 are charged up in such a polarity that both diodes are biased to cutoff during the horizontal sweep which follows the application of each pulse.

The horizontal sweep generator 76 utilizes a blocking oscillator to generate a saw-tooth wave, the blocking oscillator comprising a triode 182 having a cathode 183, a control grid 184 and a plate 185. The cathode 183 is connected through a resistor 186 to ground and also to one side of the primary 181 of the transformer 179 of the clamping circuit 71, a positive pulse being developed across the resistor 186 in coincidence with the horizontal blanking time. The grid 184 is connected through a grid-leak resistor 187 to ground and also through a capacitor 188 to one side of a winding 189 of a transformer 190 having a second winding 191 connected to the plate 185 and through a rheostat 192 to the power supply terminal 12. A capacitor 193 is connected at one side to the junction between winding 191 and rheostat 192 and at the other side to a resistor 194 which is connected through a rheostat 195 to ground, a by-pass capacitor 196 being connected across the rheostat 195. In operation of the circuit as thus far described, the tube 182 is cut off during horizontal trace and the capacitor 193 is charged through the rheostat 192 at a rate depending upon the resistance thereof, the potential of the plate 185 being increased as the charge of the capacitor 193 increases. At the same time, the capacitor 188 in the grid circuit of the tube 182 is charged in a polarity such that the grid is negative and the capacitor 188 is slowly discharging through the grid-leak resistor 187. Eventually, the triode 182 will start to conduct which through the transformer 190 (having a high coefficient of coupling between windings) causes the potential of the grid 184 to be moved further in a positive direction to cause heavy conduction through the tube 182. Grid current will be drawn which will cause charging of the capacitor 188 to oppose further rise of grid potential. The tube 182 will then become cut off and the cycle will be reinitiated.

During the short period of conduction of the triode 182, the capacitor 193 will be discharged through the triode 182 after which it will again be relatively slowly charged up through the rheostat 192. Thus, a saw-tooth voltage is developed at the junction of resistor 192 and capacitor 193. This junction is coupled through a coupling capacitor 196 to the control grid 197 of an amplifying triode 198 having a cathode 199 connected through the rheostat 195 to ground and a plate 200 connected through the primary 201 of an output transformer 202 to the power supply terminal 13. The grid 197 may be connected through a resistor 203 to ground.

The transformer 202 has a secondary winding 204 connected at one end to ground and at the other end through the horizontal deflection coil 74 for the picture tube 73 to a circuit point 205. The circuit point 205 is connected through a rheostat 206 to ground and also to the terminal 27 of the jack 20 which is connected through the camera-reproducer interconnect cable to the terminal 34 of the jack 41 which is connected to the horizontal deflection coil 43 of the camera tube 42. Thus, both deflection coils are energized from the transformer secondary winding 204, the relative amplitudes being controlled by adjustment of the rheostats 192 and 206. It might here be noted that the rheostat 195 forms a horizontal linearity control.

To control the operation of the blocking oscillator, the resistor 187 should be adjustable to form a "hold" control and means are provided for coupling a synchronizing signal to the winding 189 of the blocking oscillator transformer 190.

In particular, the winding 189 is connected to a circuit point 207 which is connected through a pair of resistors 208 and 209 to the power supply terminal 14, the junction between resistors 208 and 209 being connected through a filter capacitor 210 to ground. The circuit point 207 is also connected through a resistor 211 to the plate 212 of a triode 213 having a cathode 214 connected to ground and a grid 215 connected through a resistor 216 to ground and directly coupled also to the plate 217 of a triode 218 having a control grid 219 connected through a capacitor 220 to the movable contact 79 of the selector switch 80, the tube 218 also having a cathode 221 connected to the junction between potentiometer 91 and resistor 92 and also through a resistor 222 through the grid 219.

Since the cathode 221 is connected through the potentiometer 91 to the power supply terminal 17 which as previously indicated is at a negative potential with respect to ground, the cathode 221 is at a negative potential with respect to ground, such potential being preferably maintained substantially constant by a by-pass capacitor 223 across a resistor 92. Thus, the tube 218 can conduct from the power supply terminal 17 through the potentiometer 91 and through the plate resistor 216 to ground. Such conduction will develop a voltage across the resistor 216 which will bias the grid 215 of the tube 13 negatively with respect to ground, to which the cathode 214 thereof is connected.

As above indicated, a 60 cycle signal from the power line or the video signal developed at the circuit point 160 is coupled to the movable contact of the selector switch 80, depending upon the position thereof, and this signal is coupled through the capacitor 220 to the grid 219 of the triode 218.

During transmitting operation in which the movable contact 79 is coupled to the 60 cycle power supply signal, the positive swings of such signal will drive the grid 219 in a positive direction to increase current flow through the triode 218 and lower the potential of the plate 217 and hence of the grid 215 to reduce current flow through the triode 213, causing the potential of the plate 213 and hence the potential of the circuit point 207 to move in a positive direction. This positive signal is coupled through the capacitor 188 to the grid 184 of the blocking oscillator and if the charges on the capacitors 188 and 193 are such that the triode 182 is almost ready to conduct, this positive swing may trigger the triode 182 into conduction. Thus, the operation of the blocking oscillator may be synchronized with the 60 cycle supply voltage.

In reproducer operation of the system, the operation is similar with the contact 79 of the selector switch 80 being connected to the terminal 82 which is connected to the circuit point 160, the circuit point 160 being swung in a positive direction from the applied video signal for blanking of the picture tube 73. This positive signal applied through the capacitor 220 to the grid 219 of the triode 218 will result in a positive swing of the plate 212 of the triode 213 and thus a positive swing of the circuit point 207, which may initiate operation of the blocking oscillator.

It should be noted that in transmitting operation, a blanking signal is applied to the camera tube 42 by connecting the junction between capacitor 193 and resistor 194 through a coupling capacitor 224 to the terminal 25 of the jack 20 and hence to the terminal 32 of the jack 41 which is connected to the control grid 84 of the pick-up tube 42. During conduction of the blocking oscillator tube 182 and thus during retrace operation of the sweep circuit, the potential of the junction between capacitor 193 and resistor 194 will swing in a negative direction which will cut off the pick-up tube 42.

Important features of the invention reside in the vertical sweep generator 77. This generator develops a saw-tooth voltage at a circuit point 225 which is connected through the vertical deflection coils 75 of the picture tube 73 to a circuit point 226 which is connected through a rheostat 227 to ground and also to the terminal 27 of the jack 20 and hence to the terminal 37 of the jack 41 connected to the vertical deflection coils 44 of the camera pick-up tube 42. Thus, the amplitude of the saw-tooth voltage applied to the vertical deflection coils 44 of the pick-up tube 42 is controlled by adjustment of the rheostat 227.

The circuit point 225 is connected through a vertical size adjustment rheostat 226 to a circuit point 227 which is connected to the cathode 228 of a triode 229 having a grid 230 and a plate 231 and to the plate 232 of a triode 233 having a control grid 234 and a cathode 235. The plate 231 is connected to the power supply terminal 14 which may preferably be at a potential of approximately plus 100 volts relative to ground and the cathode 235 is connected to the power supply terminal 15 which may preferably be of a potential of approximately minus 100 volts relative to ground. If the triodes 229 and 233 conduct equally, the circuit point 227 will be at ground potential but the potential of circuit point 227 will swing positive with conduction of the tube 229 more than the tube 233 and vice versa.

The circuit point 225 is connected through a resistor 236 to the plate 237 of a control tube 238 having a control grid 239 and a cathode 240 connected through a resistor 241 to the power supply terminal 16 which may be at a potential of minus 120 volts relative to ground. The plate 237 is directly connected to the grid 230 of the triode 229 and the cathode 240 is connected through a rectifier 242 and a resistor 243 in parallel to the grid 234 of the triode 233. A capacitor 244 may be connected between the grid 234 and the cathode 235. The resistor 243 and capacitor 244 function as a filter to prevent application of power supply ripple voltages to the grid 230. The rectifier 242 provides a low impedance to negative excursions of the voltage at cathode 240 thereby permitting rapid retrace which might otherwise be prevented by the resistor 243 and capacitor 244.

It will be appreciated that with the circuit as thus far described, the relative conduction of the tubes 229, 233 can be controlled by controlling the potential of the grid 239 of the control tube 238. A saw-tooth voltage is applied to the grid 239 and for this purpose, one side of a sweep capacitor 245 is connected to the grid 239 and through a rheostat 246 to the power supply terminal 12. The other side of the sweep capacitor 245 could be connected to ground. However, to provide a negative or inverse feedback in a manner as will be described, the other side of the sweep capacitor 245 is connected to the circuit point 225.

The sweep capacitor 245 slowly charges up through the rheostat 246 and is periodically discharged by means of a relay 247 having a coil 248, a pair of movable contacts 249 and 250 engageable with fixed contacts 251 and 252. The fixed contact 252 is connected to the grid 239 and the movable contact 250 is connected to the terminal 16 of the power supply. The movable contact 249 is connected to the power supply terminal 17 and the fixed contact 251 is connected through a resistor 253 to the terminal 25 of the jack 20 which is connected to the control grid 84 of the camera pick-up tube 42, this arrangement functioning to apply a blanking voltage to the camera pick-up tube 42 when the relay 247 is actuated.

For energizing the relay coil 248, one terminal thereof is connected to the power supply terminal 14 and the other terminal thereof is connected to the plate 254 of a triode 255 having a grid 256 and a cathode 257. The grid 256 is connected to a resistor 258 to the plate 212 of the tube 213 and also through a rheostat 259 to the power supply terminal 17, a capacitor 260 being connected between the grid 256 and ground.

As previously described, the tubes 218 and 213 function to amplify the synchronizing signals or pulses and the amplified signals or pulses are developed at the plate 212 of the tube 213. The resistor 258 in combination with the capacitor 260 functions as an integrating circuit which will not respond to the relatively short duration horizontal pulses but will respond to the vertical synchronizing pulses of relatively long duration. In transmitting operation, a 60 cycle supply line signal will be transmitted to the grid 256 of sufficient amplitude to cause initiation of the vertical sweep in synchronism therewith.

To illustrate the operation of the vertical sweep generator 77, it may be assumed that the triode 255 is in a conducting state so that the relay 247 is energized to engage the contacts 249, 250 with the contacts 251, 252.

The grid 239 will then be connected to the power supply terminal 16 so that there will be minimum conduction through the tube 238. With minimum conduction through the tube 238, there will be a minimum voltage across the resistor 236 so that the grid 230 will be at a maximum potential and there will also be a minimum voltage across the cathode resistor 241 so that the grid 234 will be at a minimum potential. Thus the tube 229 will conduct to a maximum extent and the tube 233 to a minimum extent. The potential of the circuit point 227 and also the potential of the circuit point 225 will be at maximum positive values.

With the potential of the circuit point 227 at a maximum positive value, the cathode 257 of the triode 255 will be at a maximum positive value to cut-off conduction in the triode 255. This will deenergize the relay 247 after a certain time period required for discharge of a capacitor 261 in parallel with the relay coil 248, the capacitor 261 being provided to insure a vertical retrace time of adequate duration.

It should be noted that with the relay 247 energized, the capacitor 245 is connected at one side to the power supply terminal 16 and at the other side to the circuit point 225. The power supply terminal 16 may as previously indicated be at a potential of approximately minus 120 volts relative to ground and with the relay 247 energized, the circuit point 225 is at a maximum positive potential relative to ground, so that the terminal of the capacitor 245 connected to the circuit point 225 is charged positively relative to the other terminal thereof.

When the relay 247 is deenergized, the capacitor 245 may discharge through the rheostat 246 to cause a gradual rise in the potential of the grid 239 which will increase conduction through the tube 238, decrease conduction through the tube 229 and increase conduction through the tube 233 to cause the potentials of the circuit points 225 and 227 to gradually lower. The potential of the cathode 257 of the tube 255 will gradually lower until the grid bias of the tube 255 is only slightly beyond cut-off. With a positive synchronizing signal applied to the grid 256, the tube 255 may then swing into conduction to again energize the relay 247, thus completing the cycle of operation.

As previously indicated, it is a feature of the circuit of the vertical sweep generator 77 that the capacitor 245 is connected to the circuit point 225 to provide negative or inverse feedback. In particular, an increase in the conduction through the tube 238 will cause a decrease in the conduction of the tube 229 and thus a decrease in the potential of the circuit point 225. This, in turn, through the capacitor 245, will tend to cause a decrease in the potential of the grid 239 and hence a decrease in the conduction through the tube 238. A change in the potential of the grid 239 will therefor not produce as great a change in the potential of the circuit point 225 as it would if the capacitor 225 were not connected to the circuit point 225, and there is a negative or inverse feedback. The desirable effect produced by this feature is that variations in power supply voltages and other circuit conditions will have minimum effect on the operation of the circuit. If, for example, the potential of the power supply terminal 14 should increase, this would tend to produce an increase in the conduction through the tube 229 and an increase in the potential of the circuit point 225. An increase in the potential of the circuit point 225, however, will through the capacitor 245 increase the potential of the grid 239 to increase the conduction through the tube 238, decrease the potential of the grid 230 and decrease conduction through the tube 229. It will be appreciated that some change in the potential of the circuit point 225 will be produced by a change in the potential of the power supply terminal 14, but due to this action of the circuit, the change may be minimized and a certain percentage of variation in the potential of the power supply terminal 14 will result in a much less percentage variation in the potential of the circuit point 225.

With provision of this negative or inverse feedback, it is possible to use an unregulated supply for the tubes 229, 233 and 238 and yet obtain extremely stable operation. Since these tubes consume considerable power, it would be very expensive to provide a regulated supply therefor. It is desirable that the power supply terminal to which the rheostat 246 is connected should be regulated and such is the case in the circuit disclosed. However, it should be noted that there is very small current flow through the rheostat 246 and a regulated supply is easy to provide.

As has been previously indicated, a further advantage of the vertical sweep generator circuit is that conduction through the tube 229 increases while conduction through the tube 233 decreases and vice versa so that changes in the power supply load are minimized. This is very desirable in that it minimizes the effect of operation of the vertical sweep generator on the operation of other circuits, and due to the very slow sweep rate, it would be very difficult to minimize load variations by conventional methods.

Figure 3:
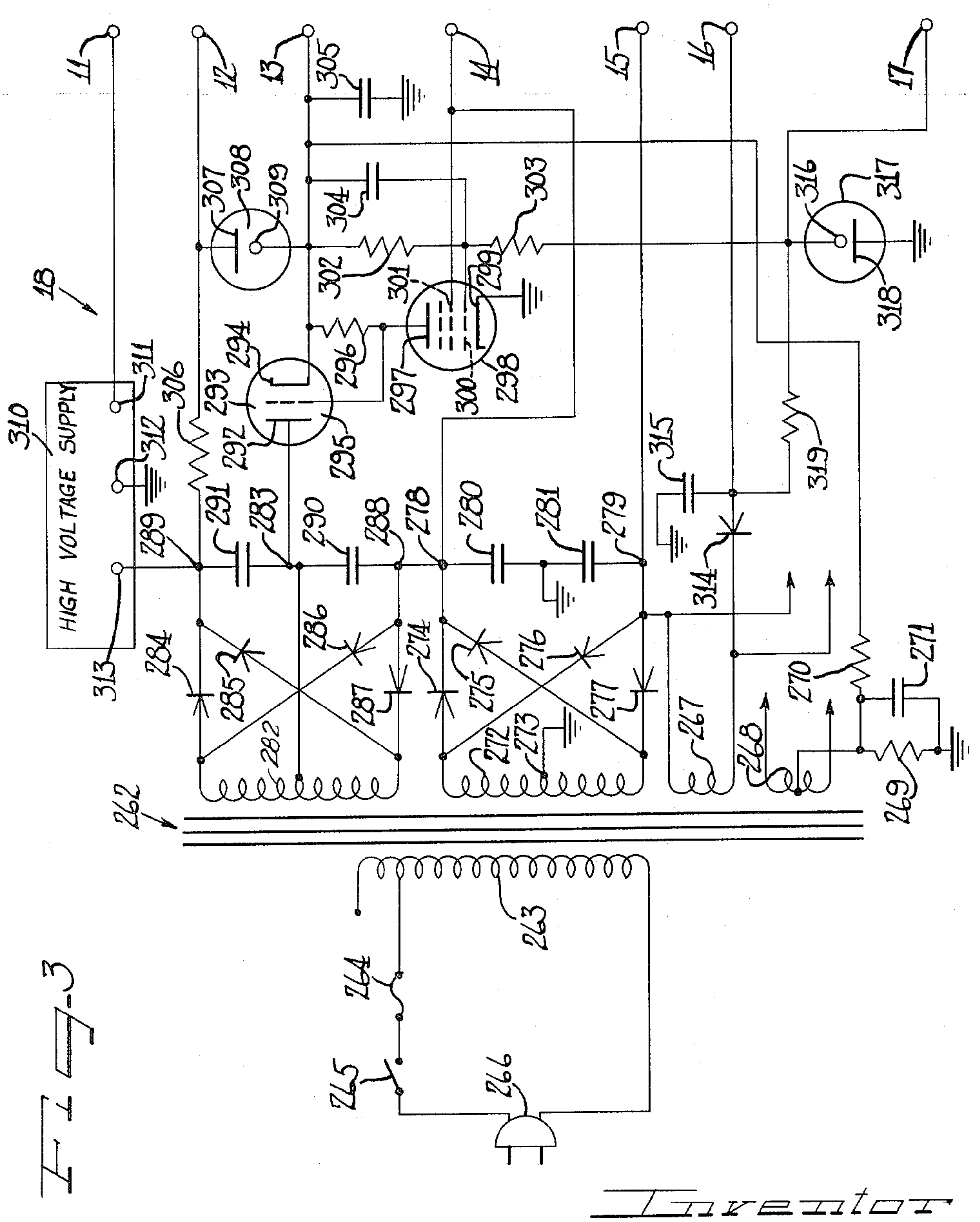
Figure 3 is a circuit diagram of a power supply of the reproducer unit of Figure 1.

Referring now to Figure 3, the power supply 18 comprises a transformer 262 having a primary winding 263 connected through a fuse 264 and a switch 265 to a suitable plug 266 for connection to a 60 cycle, 110–120 volt outlet. The transformer 262 has a first heater supply secondary 267 connected to the heaters of tubes 131, 144, 156, 182, 198, 213, 218, 229, 233 and 238 and a second heater supply secondary 268 connected to the heaters of all other tubes, the secondary 268 being connected to the terminals 29 and 30 of the jack 20 and hence to the terminals 39, 40 of the jack 41 which are connected to the heaters of the tubes 42, 105 and 115. To minimize the occurrence of cathode-heater shorts, it has been found advisable to apply a positive potential to the heaters of the tubes connected to the winding 268 and for this purpose a center tap of the winding 268 is connected through a resistor 269 to ground and through a resistor 270 to the power supply terminal 13, a capacitor 271 being connected across the resistor 269.

The transformer 262 has a first high voltage winding 272 which has a center tap 273 connected to ground, the winding 272 being connected to a bridge rectifier including elements 274, 275, 276 and 277 by which a D.C. voltage output is developed between circuit points 278 and 279. Filter capacitors 280 and 281 are respectively connected between the circuit points 278 and 279 and ground. A voltage of approximately plus 100 volts may be developed at the circuit point 278 which may be connected to the power supply terminal 14 and a voltage of approximately minus 100 volts may be developed at the circuit point 279 which is connected to the power supply terminal 15.

The transformer 262 has a second high voltage winding 282 which has a center tap connected to a circuit point 283 and which is connected to a bridge rectifier including elements 284, 285, 286 and 287 to develop an output voltage between circuit points 288 and 289, with filter capacitors 290 and 291 respectively connected between the circuit points 288 and 289 and the circuit point 283. A rectified voltage of approximately 280 volts may be developed from the winding 282 with the circuit point 283 being at approximately plus 240 volts relative to ground and the circuit point 289 being at a potential of approximately 380 volts. The circuit point 283 is connected to the power supply terminal 13 through a voltage regulating circuit. In particular, the terminal 283 is connected to the plate 292 of a triode 293 having a cathode 294 connected to the power supply terminal 13 and a control grid 295 connected through a resistor 296 to the cathode 294 and directly to the plate 297 of a pentode 298 having a cathode 299 connected to ground, a control grid 300 and a screen grid 301 connected to the circuit point 278. The control grid 300 is connected through a resistor 302 to the power supply terminal 13 and through a resistor 303 to the power supply terminal 17 which in a manner as will be described is at a regulated potential, preferably about minus 108 volts relative to ground. A capacitor 304 may be connected across the resistor 302 and a capacitor 305 may be connected between the power supply terminal 13 and ground. In operation, if the potential of the power supply terminal 13 should tend to rise, for example, the potential of the grid 300 will be raised in proportion which will raise the current flow through the pentode 298 and decrease the potential of the grid 295 of the triode 293 to reduce current conduction therethrough and lower the potential of the power supply terminal 13. A reverse operation, of course, takes place if the potential of the power supply terminal 13 should tend to lower and with this arrangement, the potential of the terminal 13 can be maintained constant to within very narrow limits.

The power supply terminal 12 which as previously indicated may preferably be at a potential of approximately 310 volts relative to ground, is connected through a resistor 306 to the circuit point 289 and the potential of the terminal 12 is maintained substantially constant by connecting the same to a plate 307 of a conventional gaseous voltage regulator tube 308 having a cathode 309 connected to the power supply terminal 13.

To supply a high voltage to the power supply terminal 11, which may be at a voltage of approximately 8000 volts relative to ground, a high voltage supply 310 is provided having a terminal 311 connected to the terminal 11, a terminal 312 connected to ground, and a terminal 313 connected to the circuit point 289. The high voltage supply 310 may be of conventional construction and is therefore not illustrated. It may, for example, comprise an oscillator operating at a frequency of 10 kilocycles or higher connected to the primary of a step-up transformer having a secondary connected to suitable rectifiers and filters.

As previously indicated, the power supply terminal 16 may be at a potential of approximately minus 120 volts relative to ground. For this purpose, one side of the heater supply secondary winding 267 is connected to the circuit point 279 and the other side thereof is connected through a rectifier 314 to the terminal 16 with a capacitor 315 connected between the terminal 16 and ground.

The power supply terminal 17 is connected to the cathode 316 of a gaseous voltage regulator tube 317 having a plate 318 connected to ground and the terminal 17 is also connected through a resistor 319 to the power supply terminal 16. The tube 17 will maintain the potential of the terminal 17 at a substantially constant value which may, for example, be minus 108 volts.

Figure 4:
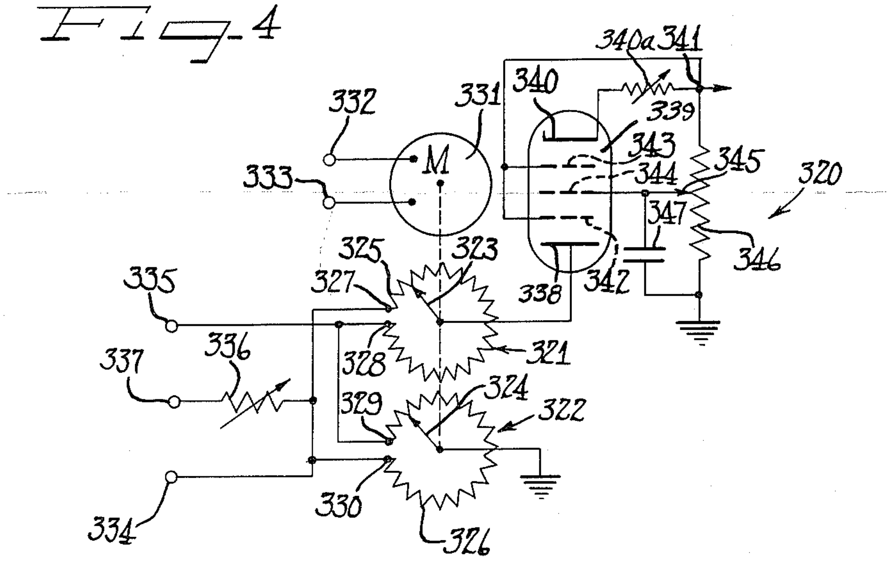
Figure 4 is a circuit diagram of a modified form of saw-tooth wave generator.

Referring now to Figure 4, reference numeral 320 generally designates a modified form of vertical sweep generator which may be selectively used in place of the vertical sweep generator 77 above described. The vertical sweep generator 320 comprises a pair of potentiometers 321 and 322 having continuously rotatable contacts 323 and 324 engageable with the resistance elements 325 and 326 extending arcuately about the axis of rotation of the contacts 323 and 324, the element 325 having end terminals 327 and 328 and the element 326 having end terminals 329 and 330. The contacts 323 and 324 are mechanically coupled together and to a synchronous electric motor 331 having terminals 332 and 333 which may be coupled to an alternating current supply line.

The terminals 327 and 330 of the resistance elements 325 and 326 are connected together and to a terminal 334 while the terminals 328 and 329 are connected together and to a terminal 335 the terminal 334 being connected to rheostat 336 to a terminal 337. The vertical deflection coils of the picture tube may be connected between the terminals 335 and 337 while the vertical deflection coils of the camera pick-up tube may be connected between the terminals 334 and 337, the rheostat 336 thus serving the same function as the rheostat 227 in the arrangement of Figure 1.

The movable contact 324 is connected to ground and the movable contact 323 is connected to the plate 338 of a pentode 339 having a cathode 340 connected through a rheostat 340a to a circuit point 341 arranged to be connected to a source of negative potential relative to ground. The pentode 339 also has a suppressor grid 342 and a control grid 343 connected together and to the circuit point 341, and a screen grid 344 connected to the movable contact 345 of a potentiometer 346 connected between ground and the circuit point 341, a capacitor 347 being connected between the screen grid 344 and ground.

In operation, when the contacts 323 and 324 are engaged with portions of the resistance elements 325 and 326 adjacent the terminals 327 and 39, the electronic current through the pentode 339 may flow from the plate 338 through the contact 323, through the terminal 327 and in one direction through the vertical deflection coils and then back through the terminal 329 through the contact 324 to ground, with relatively small current through the resistance elements 325 and 326 and with a maximum current flow in one direction through the vertical deflection coils. With clockwise rotation of the contacts 323 and 324, as viewed in Figure 4, there will be gradually increasing resistance between the contact elements 323 and 324 and the terminals 327 and 329 to gradually decrease the current flow through the deflection coils and with gradually increasing current flow through the portions of the resistance elements 325 and 326 between the contacts 323 and 324 and the terminals 328 and 330. When the contacts 323 and 324 reach a mid point, half of the current through the pentode 339 will flow through the resistance element 325 between the contact 323 and the terminal 327 and the other half will pass through the portion of the resistance element 325 between the contact 323 and the terminal 328 with a similar situation existing with respect to the potentiometer 322. At this point, there will be a balance condition with no current through the deflection coils. With further clockwise rotation of the contacts 323 and 324, the current flow through the deflection coils will be in the reverse direction and will gradually increase until the contacts 323 and 324 are engaged with the terminals 328 and 330.

Thus with continuous rotation of the contacts 323 and 324, a saw-tooth wave form of current will be generated through the vertical deflection coils.

An advantage of this arrangement is that a single power supply having a pair of terminals is required, the current flow through the deflection coils being reversed by operation of the potentiometers 321 and 322. The pentode 339 being a constant current device, maintains a substantially constant load on the power supply. The rheostat 340a and potentiometer 346 are, of course, adjustable to obtain the desired constant current and signal amplitude.

It will be appreciated that the circuit 320 may be readily substituted for the circuit 77 in the arrangement of Figure 1, the terminals 332 and 333 being connected to the power line, when transmitter operation is desired. For reproducer operation, the circuit 320 may also be substituted for the circuit 77 in the arrangement of Figure 1, if it is possible to use the power line as the synchronizing connection between the transmitting unit and the reproducing unit. In such an arrangement, the motor 331 may be mechanically adjustable about its axis to obtain proper phase relation.

If it is desired to use the circuit 320 in reproducing operation without using the power line as a synchronizing connection, a suitable generator may be provided which will generate current at the power line frequency in synchronism with the synchronizing signals.

Figure 5:
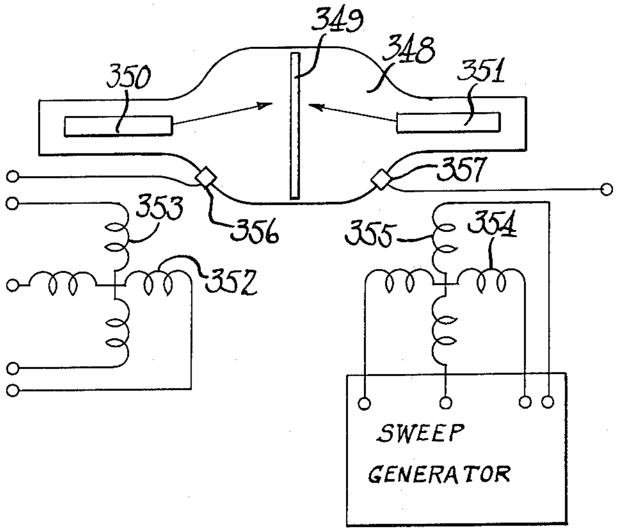
Figure 5 is a schematic diagram illustrating the use of a storage tube in the system of this invention.

Figure 5 illustrates diagrammatically the use of a storage tube in the system of this invention. In this arrangement, a storage tube 348 is used which may comprise a two-sided target 349 which is scanned on one side by a gun 350 and on the opposite side by a gun 351. Scanning of the target 349 by the gun 350 is controlled by horizontal deflection coils 352 and vertical deflection coils 353 while scanning of the target 349 by the gun 351 is controlled by horizontal deflection coils 354 and vertical deflection coils 355. A signal to be stored is applied to the secondary electron collector 356 for the gun 350 and as the beam from the gun 350 scans the target, the elements of the target will assume a potential which is dependent upon the instantaneous potential of the electron collector 356. When the scanning raster is complete, a potential pattern will exist over the target 349 which is a record of the voltage variations applied to the collector 356. When scanned from the other side by the gun 351, the charge pattern is transformed into a video signal which can be collected by a secondary-emission collector electrode 357.

To use the tube 348 in the system of this invention, the deflection coils 352 and 353 may be connected in circuit with the deflection coils 74 and 75 of the picture tube 73 and the electrode 356 may be connected to the output of the video amplifier 72. The coils 354 and 355 are connected to terminals of a sweep generator which may cause the beam from the electron gun 351 to scan the target 349 at a relatively rapid rate, as for example, the rate used in conventional television systems. The signal at the electrode 357 is then connected to the video circuit of a conventional reproducer and synchronizing signals from the sweep generator are likewise connected to the conventional reproducer.

With this arrangement, it is possible to use a reproducer having a conventional sweep rate and better reproduction is possible. In particular, with a tube such as the tube 73 used to directly reproduce the transmitted picture, a considerable period of time is required to complete one frame and even with phosphorescent materials having a long persistence time, the light intensity of the reproduced picture elements that are scanned first will be much less than the elements scanned at the completion of each frame. This effect can be eliminated by use of the storage tube 348 which can store signals for an indefinite period of time.

It will be understood that modifications and variations may be effected without departing from the spirit and scope of the novel concepts of the present invention.

I claim as my invention:

1. In a television system, a camera including a camera tube having a screen adapted to have an image focused thereon and means for impinging an electron beam on said screen for producing an electrical signal having an amplitude corresponding to the intensity of light on the portion of the screen on which said beam is impinged, amplifier means responsive to said signal and arranged to uniformly amplify frequencies up to a maximum value of less than 100 kc. per second, means for applying the amplified signal to a telephone line arranged to uniformly transmit frequencies up to said maximum value, a reproducer comprising a picture tube having a luminescent screen and means for impinging an electron beam on said screen, amplifier means responsive to the signal transmitted by said telephone line, means applying an amplified signal from said amplifier to said picture tube to control the intensity of said beam, first sweep generator means for causing periodic movement of said beams in one direction at a line rate on the order of 60 per second, and second sweep generator means for causing periodic movement of said beams in a transverse direction at a frame rate on the order of 0.1 per second, comprising: a sweep capacitor, a charging resistor connecting said sweep capacitor to a direct current source, and electromagnetic relay including a coil and a contact, means coupling said contact and said sweep capacitor for discharging said capacitor, means for periodically energizing said coil, and a capacitor in parallel with said coil for maintaining the same energized for a certain time interval.

2. In a television system, a camera including a camera tube having a screen adapted to have an image focused thereon and means for impinging an electron beam on said screen for producing an electrical signal having an amplitude corresponding to the intensity of light on the portion of the screen on which said beam is impinged, amplifier means responsive to said signal and arranged to uniformly amplify frequencies up to a maximum value of less than 100 kc. per second, means for applying the amplified signal to a telephone line arranged to uniformly transmit frequencies up to said maximum value, a reproducer comprising a picture tube having a luminescent screen and means for impinging an electron beam on said screen, amplifier means responsive to the signal transmitted by said telephone line, means applying an amplified signal from said amplifier to said picture tube to control the intensity of said beam, sweep generator means for causing periodic movement of said beams in one direction at a line rate on the order of 60 per second and in a transverse direction at a frame rate on the order of 0.1 per second, sweep generator means for causing periodic movement of said beams in one direction at a line rate on the order of 60 per second and in a transverse direction at a frame rate on the order of 0.1 per second, comprising: a direct current power supply having a center tap connection, a pair of control devices connected in series across said supply, a deflection coil connected between said center tap connection and the junction between said devices, and means applying a saw-tooth signal to said control devices to increase conduction through one while decreasing conduction through the other.

3. In a television system, a camera including a camera tube having a screen adapted to have an image focused thereon and means for impinging an electron beam on said screen for producing an electrical signal having an amplitude corresponding to the intensity of light on the portion of the screen on which said beam is impinged, amplifier means responsive to said signal and arranged to uniformly amplify frequencies up to a maximum value of less than 100 kc. per second, means for applying the amplified signal to a telephone line arranged to uniformly transmit frequencies up to said maximum value, a reproducer comprising a picture tube having a luminescent screen and means for impinging an electron beam on said screen, amplifier means responsive to the signal transmitted by said telephone line, means applying an amplified signal from said amplifier to said picture tube to control the intensity of said beam, first sweep generator means for causing periodic movement of said beams in one direction at a line rate on the order of 60 per second, and second sweep generator means for causing periodic movement of said beams in a transverse direction at a frame rate on the order of 0.1 per second, comprising: first and second pairs of terminals, a pair of potentiometers including resistance elements connected in parallel to said first pair of terminals and ganged continuously rotatable contacts engaged with said elements and connected to said other pair of terminals, one contact being moved electrically toward one of said first pair of terminals while the other contact is moved toward the other of said first pair of terminals, a deflection coil connected to one of said pairs of terminals, a current source connected to the other of said pairs of terminals, and a motor mechanically coupled to said contacts for continuously rotating the same.

4. In a sweep generator, a direct current power supply having a center tap connection, a pair of control devices connected in series across said supply, a deflection coil connected between said center tap connection and the junction between said devices, and means applying a saw-tooth signal to said control devices to increase conduction through one while decreasing conduction through the other.

5. In a sweep generator, first and second pairs of terminals, a pair of potentiometers including a pair of resistance elements connected in parallel to said first pair of terminals and a pair of ganged continuously rotatable contacts respectively engaged with said elements, means connecting one of said contacts to one of said second pair of terminals, means connecting the other of said contacts to the other of said second pair of terminals one contact being moved electrically toward one of said first pair of terminals while the other contact is moved toward the other of said first pair of terminals, a deflection coil connected to one of said pairs of terminals, a current source connected to the other of said pairs of terminals, and a motor mechanically coupled to said contact for continuously rotating the same.

6. In a television system, a camera including a camera tube having a screen adapted to have an image focused thereon and means for impinging an electron beam on said screen for producing an electrical signal having an amplitude corresponding to the intensity of light on the portion of the screen on which said beam is impinged, amplifier means responsive to said signal and arranged to uniformly amplify frequencies up to a maximum value of less than 100 kc. per second, means for applying the amplified signal to a telephone line arranged to uniformly transmit frequencies up to said maximum value, a reproducer comprising a picture tube having a luminescent screen and means for impinging an electron beam on said said screen, amplifier means responsive to the signal transmitted by said telephone line, means applying an amplified signal from said amplifier to said picture tube to control the intensity of said beam, and sweep generator means for causing periodic movement of said beams in one direction at a line rate on the order of 60 per second and in a transverse direction at a frame rate on the order of 0.1 per second, comprising: beam deflections means, a sawtooth wave generator including a sweep capacitor, means periodically operative for short time intervals for fixing the charge of said capacitor at a certain value, means operative between said time intervals for changing the charge of said capacitor to develop a sweep voltage varying substantially linearly with time, amplifier means having input and output circuits, means applying said sweep voltage to said input circuit, means coupling said output circuit to said deflection means, and means connected in circuit with said sweep capacitor and said output circuit for applying an inverse feedback to said amplifier means to maintain a substantially constant proportion between the signal applied to said deflection means and said sweep voltage.

7. In a sweep generator, beam deflection means, a sawtooth wave generator including a sweep capacitor, means periodically operative for short time intervals for fixing the charge of said capacitor at a certain value, means operative between said time intervals for changing the charge of said capacitor to develop a sweep voltage varying substantially linearly with time, amplifier means having input and output circuits, means applying said sweep voltage to said input circuit, means coupling said output circuit to said deflection means, and means connected in circuit with said sweep capacitor and said output circuit for applying an inverse feedback to said amplifier means to maintain a substantially constant proportion between the signal applied to said deflection means and said sweep voltage.

8. In a sweep generator, a direct current power supply having a center tap connection, a pair of control devices connected in series across said supply, a deflection coil connected between said center tap connection and the junction between said devices, a third control device having an input electrode and having a pair of output electrodes respectively coupled to said pair of control devices, means including a sweep capacitor for applying a sawtooth signal to said input electrode to increase conduction through one of said pair of control devices while decreasing conduction through the other, and means coupling one terminal of said sweep capacitor through said junction between said devices to apply an inverse feedback signal to said input electrode.

References Cited in the file of this patent

UNITED STATES PATENTS

| | | |
|---|---|---|
| 1,874,200 | Manderfield | Aug. 30, 1932 |
| 1,983,432 | Barthelmy | Dec. 4, 1934 |
| 2,250,476 | Evans | July 29, 1941 |
| 2,299,945 | Wendt | Oct. 27, 1942 |
| 2,420,198 | Rosenthall | May 6, 1947 |
| 2,470,197 | Torsch | May 17, 1949 |
| 2,479,081 | Poch | Aug. 16, 1949 |
| 2,629,010 | Graham | Feb. 17, 1953 |
| 2,629,011 | Graham | Feb. 17, 1953 |
| 2,633,555 | Tourshou | Mar. 31, 1953 |
| 2,644,105 | Fyler | June 30, 1953 |
| 2,700,742 | Friend | Jan. 25, 1955 |
| 2,719,249 | Friend | Sept. 27, 1955 |
| 2,729,766 | Vilkomerson | Jan. 3, 1956 |

OTHER REFERENCES

"Cathode Ray Oscilloscopes and Their Uses," Rider and Olson, Rider and Co., New York, N.Y., 1951, pages 137, 138, 316, and 862.

"Basic Television," Grob, 1954.